United States Patent Office 2,813,075
Patented Nov. 12, 1957

2,813,075

TREATMENT OF CORROSIVE WATER

Jesse M. Brooke, Sweeny, Tex., assignor to Phillips Petroleum Company, a corporation of Delaware No Drawing. Application July 17, 1953,
Serial No. 368,837

10 Claims. (Cl. 252—8.55)

This invention relates to the treatment of corrosive water in contact with metals. In one of its more specific aspects, this invention relates to a method and composition for the prevention of corrosion of ferruginous metals which are in contact with corrosive water. In another of its more specific aspects, it relates to a method and composition for the prevention of corrosion of copper which is in contact with aqueous chlorine solutions.

Various phosphates have been employed for the treatment of cooling water and other aqueous solutions in contact with iron and steel equipment. Although these phosphate materials have provided a measure of protection both alone and in combination with other compounds, the protection obtained has not been complete and there has been a continued desire for more adequate protection of metals which are subjected to contact with corrosive water. The corrosion can be controlled to a great extent by maintaining the pH of the cooling or other water above about 8. However, if cooling water having a pH above 8 is employed, scaling of the metallic equipment occurs and as a result the pH of cooling waters is usually maintained at some point below 7, usually in the range 5.5 to 6.5 and a corrosion inhibitor is employed to offset the corrosive effect of such acidic cooling water.

The only metals, other than iron and steel, ordinarily coming in contact with cooling water are admiralty and aluminum. These metals are not normally subject to attack by cooling water and hence require no protection.

Chlorine is often used in the treatment of industrial water, including cooling water, and concentrated solutions of chlorine used in such treatment presents a corrosion problem when prepared in metal containers.

Each of the following objects will be attained by at least one of the aspects of this invention.

It is an object of this invention to provide a method for controlling the scaling and corrosion of metals in contact with aqueous solutions.

It is another object of this invention to provide a method for controlling the corrosion of metals in contact with an acidic aqueous solution.

It is another object of this invention to provide a method for controlling biological growths in cooling water.

It is another object of this invention to provide a method for controlling the corrosion of copper in aqueous chlorine solutions.

It is still another object to provide a novel corrosion inhibiting compound for inhibiting corrosion of ferruginous metals.

It is still aother object to provide a novel corrosion inhibitor which is also a biological growth inhibitor.

It is still another object to provide a method and a composition for inhibiting the corrosion of casings and tubings in an oil well.

Other objects and advantages will be apparent to one skilled in the art upon reading this disclosure.

I have discovered that cupric chloride is an excellent synergist for use with molecularly dehydrated phosphates for controlling the corrosion of metals in contact with aqueous solutions. The novel corrosion inhibitor of this invention is also an effective inhibitor of biological growths in aqueous solutions.

I have found that cupric chloride is an effective synergist for phosphate compounds in general but is particularly effective when used with the molecularly dehydrated phosphates, one of which is sometimes referred to as septaphosphate. These molecularly dehydrated phosphates are glassy phosphates and are well known materials which can be obtained commercially. Sodium septaphosphate is preferably used in the practice of my invention but other water soluble metallic phosphates and polyphosphates can also be used. Phosphates which are applicable include tetrasodium pyrophosphate $Na_4P_2O_7$, sodium tripolyphosphate $Na_5P_3O_{10}$, sodium tetraphosphate $Na_6P_4O_{13}$, sodium hexametaphosphate $Na_6P_6O_{18}$, sodium septaphosphate $Na_9P_7O_{22}$, sodium decaphosphate $Na_{12}P_{10}O_{31}$ and the like. The alkali metal phosphates are preferred.

I have also found that the molecularly dehydrated phosphates are excellent inhibitors for the corrosion of copper in concentrated aqueous chlorine solutions. I have found that these phosphates inhibit corrosion of copper in aqueous chlorine solutions having a chlorine content in excess of 100 parts per million. The solubility of chlorine in water at room conditions of temperature and pressure is about 1000 parts per million. The pH of such solutions varies from about 2 to about 4.

In the practice of my invention, I use from about 10 p. p. m. to 200 p. p. m. and preferably about 20 p. p. m. to about 100 p. p. m. of the phosphate and from about 10 p. p. m. to 200 p. p. m. and preferably about 20 to 100 p. p. m. of cupric chloride in the treatment of cooling water in contact with steel or iron. I follow the standard practice of calculating the p. p. m. of phosphate added on the basis of available $PO_4\equiv$ in the phosphate compound. Although any proportions of each component within the above range can be employed, I usually prefer to use approximately equal proportions of each component in treating cooling, or other, water. In treating a typical cooling water for use in contact with metallic surfaces such as heat exchangers, condensers, and spray towers, the pH of the water is usually maintained in the range of 6 to 6.5 so as to prevent scale formation. In such cooling water system, I use a sufficient amount of my novel corrosion inhibitor so as to maintain a concentration of phosphate within the range of 20 to 100 p. p. m. preferably in the range of 30 to 60 p. p. m. and cupric chloride in the range 20 to 100 p. p. m. and preferably in the range of 30 to 60 p. p. m. In a cooling water system wherein the pH and the concentration of corrosion inhibitor is maintained as set forth above, scaling and corrosion are substantially prevented and the cooling water is maintained free of biological growths.

In oil wells wherein minor amounts of water and carbon dioxide are present with the hydrocarbon fluids produced in the well, the tubing and casing are subject to corrosion by the carbon dioxide which is maintained in solution because of the elevated pressure conditions in the well. The corrosion resulting from the carbon dioxide in solution can be controlled and prevented by introducing into said well the novel corrosion inhibitor of my invention. A preferred method for introducing a fairly constant amount of corrosion inhibitor in controlled quantities can be achieved by admixing my novel corrosion inhibitor comprising a molecularly dehydrated phosphate and cupric chloride with a binder material which is insoluble in hydrocarbons and which has limited solubility in water. Binder materials which can be incorporated with my corrosion inhibitor include calcium carbonate, sodium carbonate, calcium sulfate, and the like. These materials are preferably admixed and formed into cylindrical rods adapted to be introduced to the interior of the oil well casing through a suitable lubricator. An alternative method is to introduce a concentrated solution of the corrosion prevention materials into the well through a separate line of small pipe. By using this latter method the chemical can be introduced at any desired depth.

EXAMPLE I

A raw water having a pH of 6.5 was used to contact an aerated specimen of S. A. E. 1020 steel and a corrosion rate of 165 mils per year resulted. The same water treated with 40 p. p. m. of a molecularly dehydrated phosphate having the formula $Na_9P_7O_{22}$ showed a corrosion rate of 145 mils per year. The raw water treated with 40 p. p. m. of the molecularly dehydrated phosphate and 40 p. p. m. cupric chloride showed a corrosion rate of less than 1 mil per year.

EXAMPLE II

Runs were made using sections of ASTM test specimens, designation 1020 steel. They were rotated at about 10 R. P. M. in the various solutions for 24 hours. The weight loss was determined and the penetration calculated. The term percent protection was determined from the formula $$Percent = \frac{W_0 - W_1}{W_0} \times 100$$

wherein $W_0$ = Wt. loss in distilled water
$W_1$ = Wt. loss in test solution

The results of the runs described in Example II are tabulated in Table I.

Table I

| $Na_9P_7O_{22}$ p. p. m. as $PO_4^\equiv$ | Synergist | P. p. m. | Initial Wt., Gms. | Final Wt., Gms. | Wt. Loss, Gms. | Penetration, Mils/Yr. | Percent Protection |
|---|---|---|---|---|---|---|---|
| 0 | None | 0 | 26.4636 | 26.1270 | 0.3366 | 164.9 | 0 |
| 29 | None | 0 | 26.1270 | 25.8300 | 0.2970 | 145.5 | 11.8 |
| 29 | CuSO₄ | 40 | 25.8236 | 25.5930 | 0.2306 | 113.0 | 31.5 |
| 29 | CuSO₄ | 100 | 25.5920 | 25.3880 | 0.2040 | 100.0 | 39.1 |
| 29 | CuCl₂ | 100 | 25.3840 | 25.3817 | 0.0023 | 1.1 | 99.3 |
| 29 | CuCl₂ | 50 | 25.3817 | 25.3234 | 0.0583 | 28.6 | 82.7 |
| 29 | CuCl₂ | 25 | 26.4389 | 26.2370 | 0.2019 | 98.9 | 40.0 |
| 29 | CuCl₂ | 10 | 26.5157 | 26.3713 | 0.1444 | 70.8 | 57.1 |

The results of these runs demonstrate that not all copper salts act as synergists in inhibiting corrosion of metals.

In the practice of my invention for the protection of copper surfaces in contact with aqueous chlorine solutions, I use from 10 to 200 preferably 20 to 50 P. P. M. of the phosphate, calculated on the basis of $PO_4^\equiv$.

The following example demonstrates the protection of copper in aqueous chlorine solutions.

EXAMPLE III

Pure copper strips 3 square inches in area were suspended in test solutions for 24 hours at atmospheric pressure and room temperature. They were then removed, cleaned and weighed. The results are shown in Table II.

Table II

| $Na_9P_7O_{22}$ p. p. m. as $PO_4^\equiv$ | Chlorine, p. p. m. | Penetration, Mils/Yr. |
|---|---|---|
| 0 | 1,000 | 100 |
| 0 | 700 | 93 |
| 10 | 525 | 8.4 |
| 20 | 1,000 | 8 |
| 110 | 525 | 14.4 |
| 200 | 630 | 9.2 |

A small amount of cupric chloride exists in such aqueous chlorine solution.

The foregoing examples demonstrate the operation of my invention but are not to be construed to limit the invention.

Reasonable variations and modifications are possible within the scope of the disclosure of this invention, the essence of which is that cupric chloride has been found to act as a synergist when combined with a molecularly dehydrated phosphate used to prevent corrosion of metals in contact with aqueous solutions and that molecularly dehydrated phosphates inhibit the corrosion of copper in aqueous chlorine solutions.

I claim:

1. A method for reducing corrosion of a metal selected from the group consisting of ferruginous metals and copper in contact with an aqueous solution having a pH below 7 which comprises maintaining from 10 to 200 parts per million of a water-soluble, alkali metal molecularly dehydrated phosphate and from 10 to 200 parts per million of cupric chloride in said solution.

2. A method for reducing corrosion of a ferruginous metal in contact with an aqueous solution having a pH below 7 and biological growth in said solution which comprises adding to said solution substantially equal proportions of a water-soluble, alkali metal molecularly dehydrated phosphate and cupric chloride.

3. A corrosion inhibiting composition having as essential active ingredients substantially equal proportions of a water-soluble, alkali metal molecularly dehydrated phosphate and cupric chloride.

4. A method for inhibiting corrosion of ferruginous metals in contact with aqueous solutions having a pH below about 7 which comprises adding between 20 and 100 p. p. m. of a water-soluble, alkali metal molecularly dehydrated phosphate and between 20 and 100 p. p. m. of cupric chloride to said solution.

5. A method for inhibiting scaling and corrosion of ferruginous metals in contact with water which comprises maintaining the pH of said water in the range of 5 to 7; and adding between 20 and 100 p. p. m. of a water-soluble, alkali metal molecularly dehydrated phosphate and between 20 and 100 p. p. m. of cupric chloride to said water.

6. A method for reducing corrosion of casing in an oil well by water and carbon dioxide present in the fluids produced by said oil well wherein said fluids have a pH below 7 which comprises adding from 10 to 200 parts per million of a water-soluble, alkali metal molecularly dehydrated phosphate and from 10 to 200 parts per million of cupric chloride to the fluids in said well.

7. The method of claim 6 wherein the phosphate and cupric chloride are added to the fluid in the well in the form of an aqueous solution.

8. A method for inhibiting corrosion of copper in contact with an aqueous chlorine solution containing at least 100 parts per million of chlorine which comprises admixing from 10 to 200 parts per million of a water-soluble, alkali metal molecularly dehydrated phosphate with said chlorine solution.

9. A method for inhibiting corrosion of copper in contact with an aqueous chlorine solution containing from 100 to 1000 parts per million of chlorine which comprises admixing from 10 to 200 parts per million of a water-soluble, alkali metal molecularly dehydrated phosphate with said chlorine solution.

10. A method for inhibiting corrosion of copper in contact with an aqueous solution of chlorine containing from 500 to 1000 parts per million of chlorine which comprises admixing from 20 to 50 parts per million of a water-soluble, alkali metal molecularly dehydrated phosphate with said chlorine solution.

References Cited in the file of this patent

UNITED STATES PATENTS

| | | |
|---|---|---|
| Re. 23,740 | Ryznar et al. | Nov. 17, 1953 |
| 1,582,974 | Garbavino | May 4, 1926 |
| 1,853,341 | Djidich | Apr. 12, 1932 |
| 2,097,847 | Strauch | Nov. 2, 1937 |
| 2,332,209 | Enquist | Oct. 19, 1943 |
| 2,429,593 | Case | Oct. 28, 1947 |
| 2,462,638 | Hethevington | Feb. 22, 1949 |
| 2,635,996 | Rohrback et al. | Apr. 21, 1953 |
| 2,653,177 | Kemp et al. | Sept. 22, 1953 |
| 2,657,178 | Robinson | Oct. 27, 1953 |
| 2,657,179 | Robinson | Oct. 27, 1953 |

OTHER REFERENCES

Cohen: Sodium Hexametaphosphate as a Corrosion Inhibitor for Ottawa Tap Water, preprint 89–17 of the Electro-chemical Society, released April 15, 1946, pages 193–207.